United States Patent
Xia et al.

(10) Patent No.: US 10,018,280 B2
(45) Date of Patent: Jul. 10, 2018

(54) VALVE

(71) Applicant: Zhejiang Natural Travel Goods Co., Ltd., Zhejiang (CN)

(72) Inventors: Yonghui Xia, Zhejiang (CN); Jinglong Cao, Zhejiang (CN)

(73) Assignee: Zhejiang Natural Travel Goods Co., Ltd. (CN)

( * ) Notice: Subject to any disclaimer, the term of this patent is extended or adjusted under 35 U.S.C. 154(b) by 40 days.

(21) Appl. No.: 15/161,644

(22) Filed: May 23, 2016

(65) Prior Publication Data

US 2017/0241557 A1    Aug. 24, 2017

(30) Foreign Application Priority Data

Feb. 22, 2016  (CN) .......................... 2016 1 0096361

(51) Int. Cl.
| | |
|---|---|
| *F16K 15/14* | (2006.01) |
| *F16K 15/20* | (2006.01) |
| *F16K 7/17* | (2006.01) |
| *F16K 1/22* | (2006.01) |
| *F16K 15/18* | (2006.01) |

(52) U.S. Cl.
CPC ............ *F16K 15/202* (2013.01); *F16K 1/222* (2013.01); *F16K 7/17* (2013.01); *F16K 15/144* (2013.01); *F16K 15/148* (2013.01); *F16K 15/185* (2013.01); *F16K 15/205* (2013.01)

(58) Field of Classification Search
CPC .... F16K 15/148; F16K 15/202; F16K 15/205; B65G 47/91
USPC ......................................................... 137/854
See application file for complete search history.

(56) References Cited

U.S. PATENT DOCUMENTS

| | | | | |
|---|---|---|---|---|
| 2,038,267 | A * | 4/1936 | Bullard ................. | F16K 15/148 128/201.19 |
| 2,571,893 | A * | 10/1951 | Kendall ............... | H01M 2/1205 137/469 |
| 2,839,073 | A * | 6/1958 | Marsh .................. | F16K 15/202 137/232 |
| 7,051,753 | B1* | 5/2006 | Caires ................... | F16K 15/205 137/232 |
| 2016/0223095 | A1* | 8/2016 | Sando ...................... | F16K 7/17 |

FOREIGN PATENT DOCUMENTS

WO    WO 2015051394 A1 *  4/2015  ............... F16K 7/17

* cited by examiner

*Primary Examiner* — Craig Schneider
*Assistant Examiner* — P. Macade Nichols
(74) *Attorney, Agent, or Firm* — Harness, Dickey & Pierce, P.L.C.

(57) ABSTRACT

Provided is a valve, relating to the mechanical equipment technical field, comprising a valve body provided with a passage configured for allowing a fluid to pass through and a valve core disk provided within the passage and rotatable relative to the valve body. The valve core disk is provided with through holes and has one side face provided with a one-way diaphragm which is used for sealing the through holes in one direction to enable the valve core disk to seal the passage in one direction. Since the valve core disk can rotate relative to the valve body, one-way-inflation and -deflation can be realized, and during deflation, the passage can be opened for deflation just by rotating the valve core disk. Users can adjust a deflating speed by rotating the valve core disk. The valve not only has a simple structure, but also is convenient for the user to deflate.

11 Claims, 21 Drawing Sheets

VALVE

CROSS-REFERENCE TO RELATED APPLICATIONS

This application claims the benefit of Chinese Application No. 2016-10-096361, filed on Feb. 22, 2016. The disclosure of the prior application is hereby incorporated by reference herein in its entirety.

TECHNICAL FIELD

The present invention relates to the technical field of mechanical equipment, and particularly to a valve.

BACKGROUND ART

Valves are control components in fluid delivery systems, and have functions such as cutting off, regulating, flow directing, backflow preventing, voltage stabilizing, flow distributing or pressure relieving by overflowing and the like. Taking inflatable objects in daily life, such as swim rings, rubber boats, inflatable toys or inflatable furniture, inflatable mattresses, inflatable tents and so on for example, these inflatable objects all, should be provided with valves for inflation and deflation.

The valve in the prior art comprises a valve seat, a valve body and a one-way valve plate, wherein the valve seat is a hollow housing with both ends opened; the valve body is a hollow housing with one end opened, and a closed end face of the valve body is provided with a through hole; the one-way valve plate is attached to an outer surface of the closed end of the valve body; and the valve body is removably mounted within the valve seat, the valve seat is provided on an inflatable object which needs to be mounted with a valve, and the closed end of the valve body is located within the inflatable object.

During inflating, the one-way valve plate is opened towards the inside of the inflatable object, so that a gas passage is smooth. After the inflation is completed, the one-way valve plate abuts against the valve body due to that a gas pressure inside the inflatable object is greater than a pressure of outside atmosphere, thus closing the gas passage and preventing leakage of the gas inside. During deflating, it is required to remove the valve body from the valve seat for deflation. However, the valves in the prior art not only have a complicated structure, but also are inconvenient for a user to deflate the inflatable object.

SUMMARY OF THE INVENTION

An object of the present invention is to provide a valve so as to address the technical problems in the art that the valves in the prior art not only have a complicated structure but also are inconvenient for the user to deflate the inflatable object.

The present invention provides a valve, comprising a valve body and a valve core disk, wherein the valve body is provided with a passage configured for allowing a fluid to pass through; the valve core disk is provided within the passage and is rotatable with respect to the valve body; the valve core disk is provided with through holes, one side face of the valve core disk is provided with a one-way diaphragm, and the one-way diaphragm is configured for sealing the through holes in one direction, so as to enable the valve core disk to seal the passage in one direction.

Further, the valve core disk and a section of the passage both are in a circular shape; on an outer circumferential surface of the valve core disk, an annular slot is provided along an extending direction of the outer circumferential surface; a seal ring is provided in the annular slot; the seal ring is in interference fit with a side wall of the passage, so as to fill in a gap between the valve core disk and the side wall of the passage, and to enable the valve core disk to universally rotate with respect to the valve body.

Further, a blocking part is provided at an opening at one end of the valve body; the blocking part is a hollow housing with one end opened, and the blocking part is in a hollowed-out shape.

Further, the valve also comprises an upper cover, the upper cover being provided on an end port of the valve body for sealing the passage.

Further, the valve core disk is provided with a plurality of through holes, and the plurality of through holes are distributed, in a circular shape, on the valve core disk, forming a circular shape whose circle center is at a circle center of the valve core disk; and a central portion of the one-way diaphragm is fixedly connected with a central portion of the valve core disk.

Further, a one-way diaphragm connecting rod is provided at a center of the one-way diaphragm, and the one-way diaphragm connecting rod is perpendicular to the one-way diaphragm; and the valve core disk is at its center provided with a clamping hole for clamping the one-way diaphragm connecting rod.

Further, the through holes are in a fan shape, and a circle center of the fan shape is close to the circle center of the valve core disk; a stop block is provided on an arc-shaped edge of each through hole, and the stop block is configured to block the one-way diaphragm.

Further, the valve also comprises a base, and the base is provided with a mounting hole for mounting the valve body.

Further, the upper cover is provided with a connecting sheet, and an annular baffle is provided on an edge of one end of the valve body close to the upper cover; the base is provided with a recess for receiving the connecting sheet; and the annular baffle is configured to fix the connecting sheet in the recess.

Further, the upper cover and the base are connected through a connecting belt, and the upper cover, the base and the connecting belt are designed to be integrated.

In the valve provided in the present invention, the valve core disk is rotationally provided within the passage of the valve body, and the one-way diaphragm is provided on the valve core disk. During inflation, the valve core disk is rotated to a position where the gas is only allowed to enter the inflatable object, and the inflatable object is inflated using an inflating tool, and at this time, the gas will push the one-way diaphragm towards the inside of the inflatable object, so as to open the passage. After the inflation is completed, the one-way diaphragm abuts against the valve body due to that a gas pressure inside the inflatable object is greater than a pressure of outside atmosphere, and seals the through holes. When the valve core disk is rotated, the passage can be opened to be in a straight-through state, and a user can change the size of a port of the passage by rotating the valve core disk, so as to adjust an inflating speed and a deflating speed. The user, when needing to accommodate the inflatable object, can rotate the valve core disk to a position where the gas is only allowed to flow out from the inflatable object, and since the gas pressure inside the inflatable object is smaller than the pressure of the outside atmosphere during the extruding process, the one-way diaphragm is enabled to abut against the valve body, forming a state where the gas can only go out but cannot go in, and then the gas of the inflatable object is extruded out, reducing the volume of the inflatable object as much as possible. The valve not only has a simple structure, but also is convenient for the user to inflate and deflate.

BRIEF DESCRIPTION OF DRAWINGS

In order to more clearly illustrate technical solutions of specific embodiments of the present invention or the prior art, figures which are needed for description of the specific embodiments or the prior art will be introduced briefly below. Apparently, the figures described below show some embodiments of the present invention, and a person ordinarily skilled in the art also can obtain other figures according to these figures, without paying inventive efforts.

FIG. 2 is a structural schematic diagram of the valve provided in the example of the present invention when being straight-through;

DETAILED DESCRIPTION OF EMBODIMENTS

Below, the technical solutions of the present invention will be described clearly and completely in conjunction with figures. Apparently, the described examples are some but not all examples of the present invention. Based on the examples of the present invention, all other examples, which a person ordinarily skilled in the art obtains without paying inventive efforts, fall within the scope of protection of the present invention.

In the description of the present invention, it should be indicated that orientational or positional relationships indicated by terms such as "center", "upper", "lower", "left", "right", "vertical", "horizontal", "inner", and "outer" are based on orientational or positional relationships as shown in the figures, merely for facilitating describing the present invention and simplifying the description, rather than indicating or suggesting that related devices or elements have to be in the specific orientation or configured and operated in specific orientation, therefore they should not be construed as limiting the present invention. Besides, terms "first", "second", and "third" are used merely for descriptive purpose, but should not be understood as indicating or suggesting to have importance in relativity.

In the description of the present invention, it should be indicated that unless otherwise expressly specified and defined, terms "installation", "join", and "connection" should be understood widely, for example, it may be a fixed connection, a detachable connection, or an integrated connection; it may be a mechanical connection, or an electrical connection; it may be a direct connection, or an indirect connection through an intermediate medium; and it also may be an inner communication between two elements. For a person ordinarily skilled in the art, the specific meanings of the above-mentioned terms in the present invention can be understood according specific circumstances.

Figure 1:
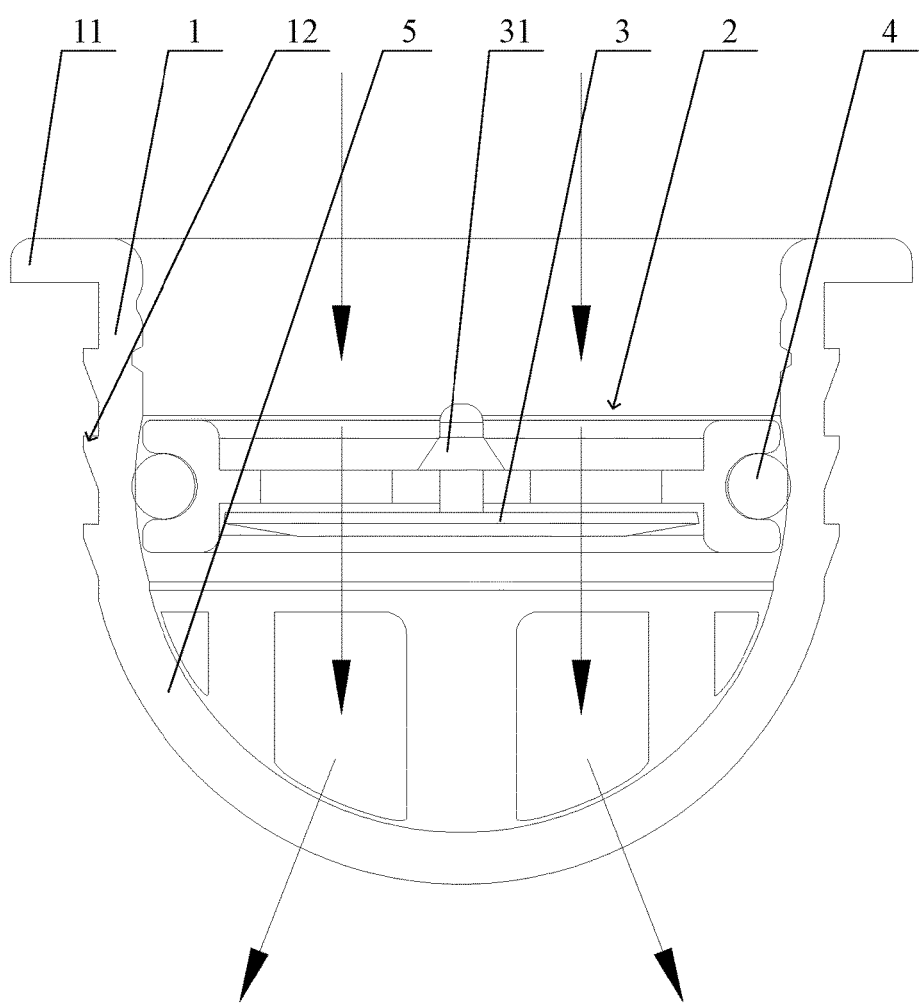
FIG. 1 is a structural schematic diagram of a valve provided in an example of the present invention when inflated in one direction.
Figure 2:
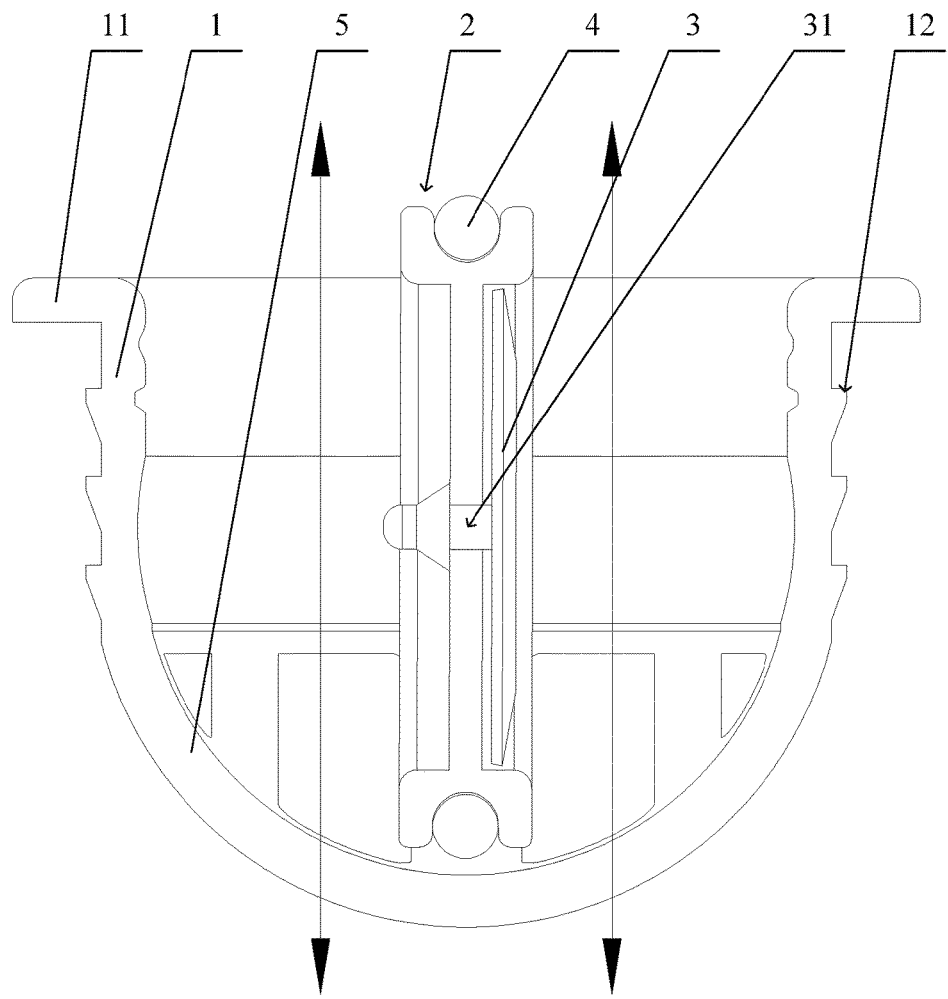
Figure 3:
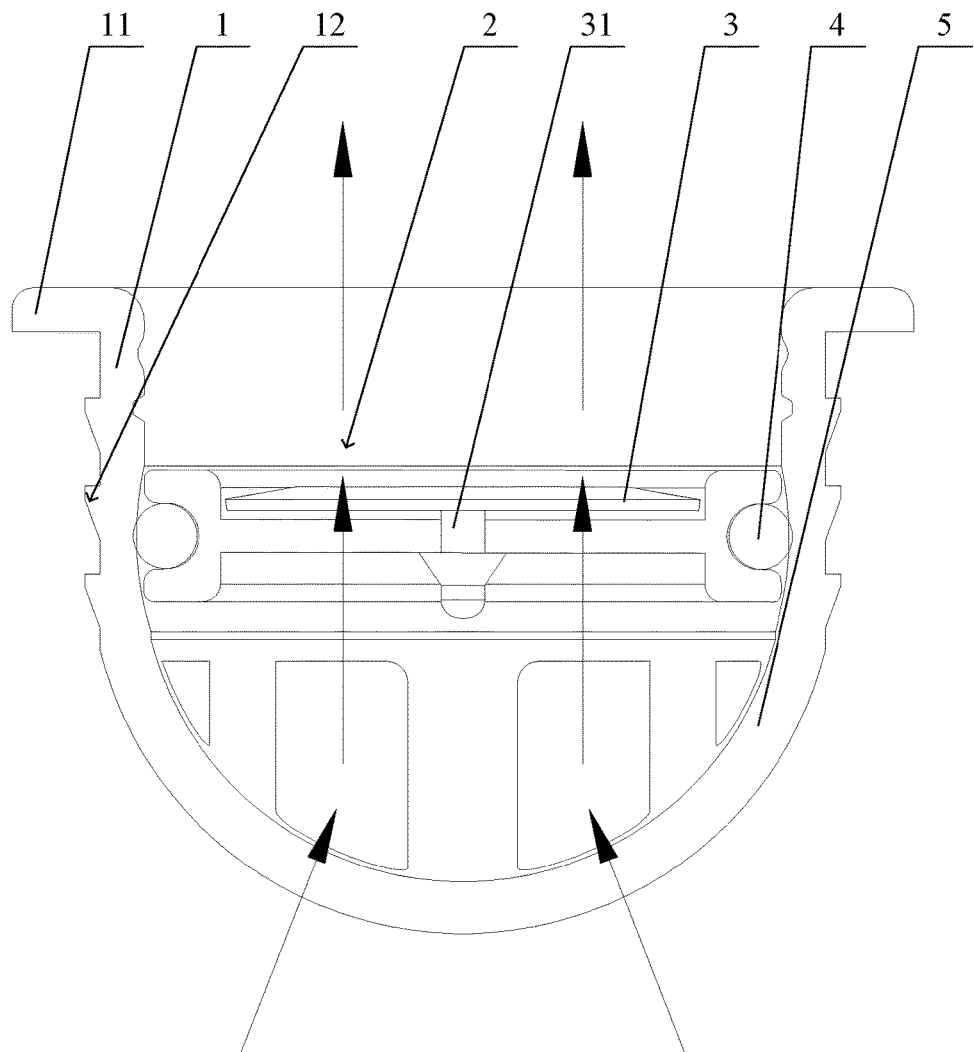
FIG. 3 is a structural schematic diagram of the valve provided in the example of the present invention when deflated in one direction.

FIG. 1 is a structural schematic diagram of a valve provided in an example of the present invention when inflated in one direction; FIG. 2 is a structural schematic diagram of the valve provided in the example of the present invention when being straight-through; and FIG. 3 is a structural schematic diagram of the valve provided in the example of the present invention when deflated in one direction. As shown in FIG. 1 to FIG. 3, a valve provided in the present example comprises a valve body 1 and a valve core disk 2, wherein the valve body 1 is provided with a passage configured for allowing a fluid to pass through; the valve core disk 2 is provided within the passage and is rotatable with respect to the valve body 1; the valve core disk 2 is provided with through holes 21, one side face of the valve core disk 2 is provided with a one-way diaphragm 3, and the one-way diaphragm 3 is configured for sealing the through holes 21 in one direction, so as to enable the valve core disk 2 to seal the passage in one direction.

In the above, the valve body 1 can be in various shapes, for example, cube, cuboid or cylinder and so on, while a section of the passage therein can be in a square shape, an elliptic shape or a circular shape and so on, preferably a circular shape.

The valve body 1 also can be made from various materials, for example, aluminum alloy, copper alloy or stainless steel and other metallic materials, and also can be made from non-metallic materials such as plastic.

The valve core disk 2 can be in various structural forms, for example, the valve core disk 2 can be in a plate-like structure which is circular, square or elliptic, and preferably, the shape of the valve core disk 2, identical with the shape of the section of the passage, is circular.

Of course, the valve core disk 2 can comprise an annular portion, a fixed portion and a plurality of valve core disk connecting rods 23. One ends of the plurality of valve core disk connecting rods 23 are successively and at interval provided around the fixed portion, and the other end of each valve core disk connecting rod 23 is connected with the annular portion. In this way, the annular portion, the fixed portion and two adjacent valve core disk connecting rods 23 form the through hole 21.

Figure 21:
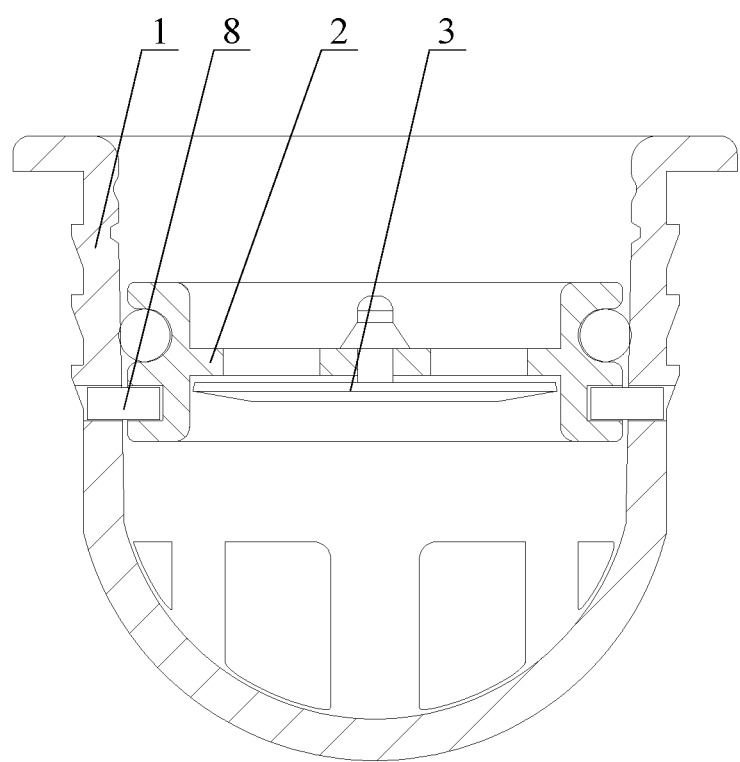
FIG. 21 is a structural schematic diagram of a valve provided in a further example of the present invention when inflated in one direction.
Figure 22:
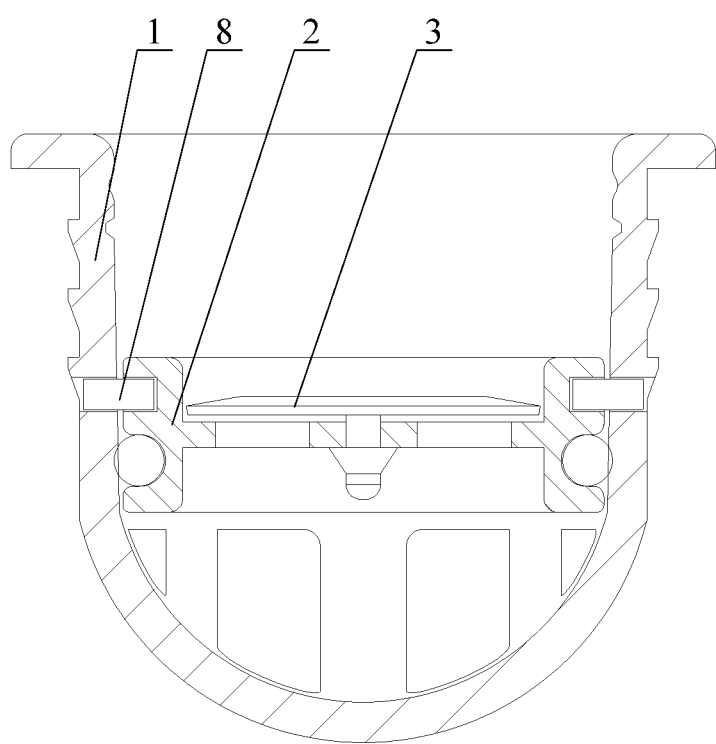
FIG. 22 is a structural schematic diagram of the valve provided in the further example of the present invention when deflated in one direction.
Figure 23:
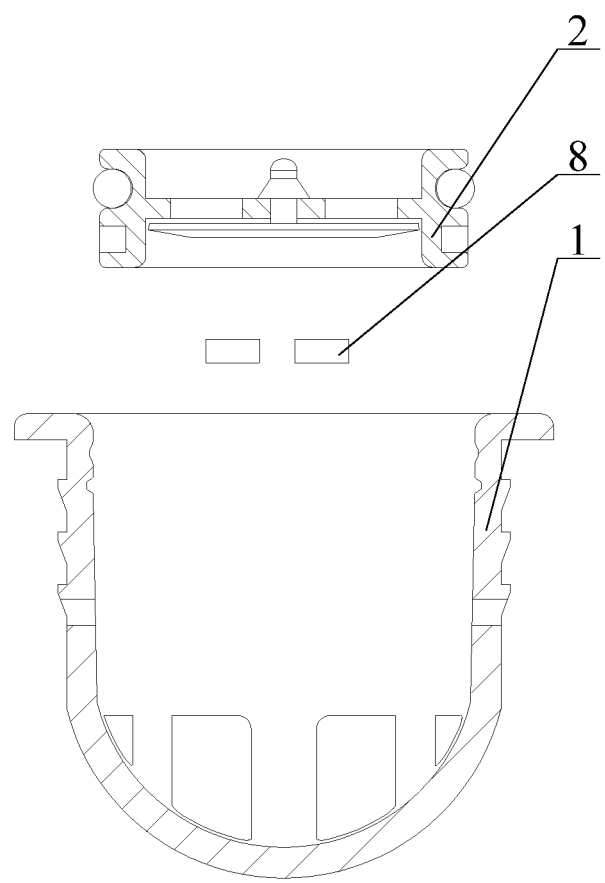
FIG. 23 is an explosive view of the valve provided in FIG. 21.

The valve body 1 and the valve core disk 2 can be connected in various ways, for example, FIG. 21 is a structural schematic diagram of a valve provided in a further example of the present invention when inflated in one direction; FIG. 22 is a structural schematic diagram of the valve provided in the further example of the present invention when deflated in one direction; FIG. 23 is an explosive view of the valve provided in FIG. 21. As shown in FIG. 21 to FIG. 23, the valve core disk 2 and the valve 1 can rotate through connection by pins 8. Of course, it also can be realized through shaft connection, through a connection manner in which a cylindrical boss and a cylindrical recess are matched, or also through a manner of a seal ring 4 in the following examples and so on, as long as the valve core disk 2 can be enabled to rotate with respect to the valve body 1.

The one-way diaphragm 3 and the valve core disk 2 can be connected in various ways, for example, bonding or clamping and so on. The one-way diaphragm 3 also can be connected with the valve core disk 2 through a one-way diaphragm connecting rod 31.

Figure 16:
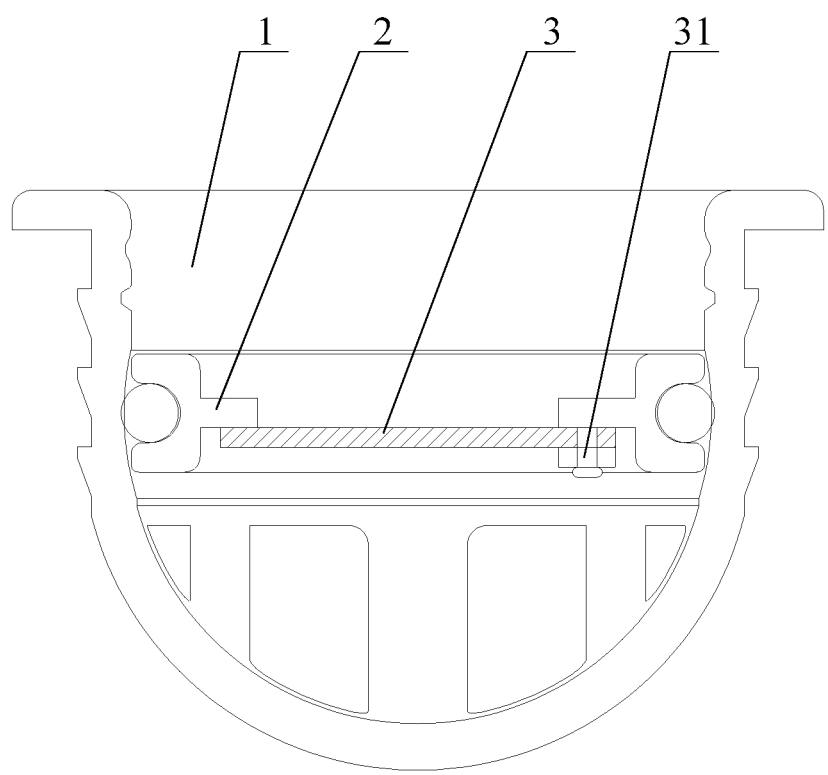
FIG. 16 is a structural schematic diagram of a valve provided in still another example of the present invention.
Figure 17:
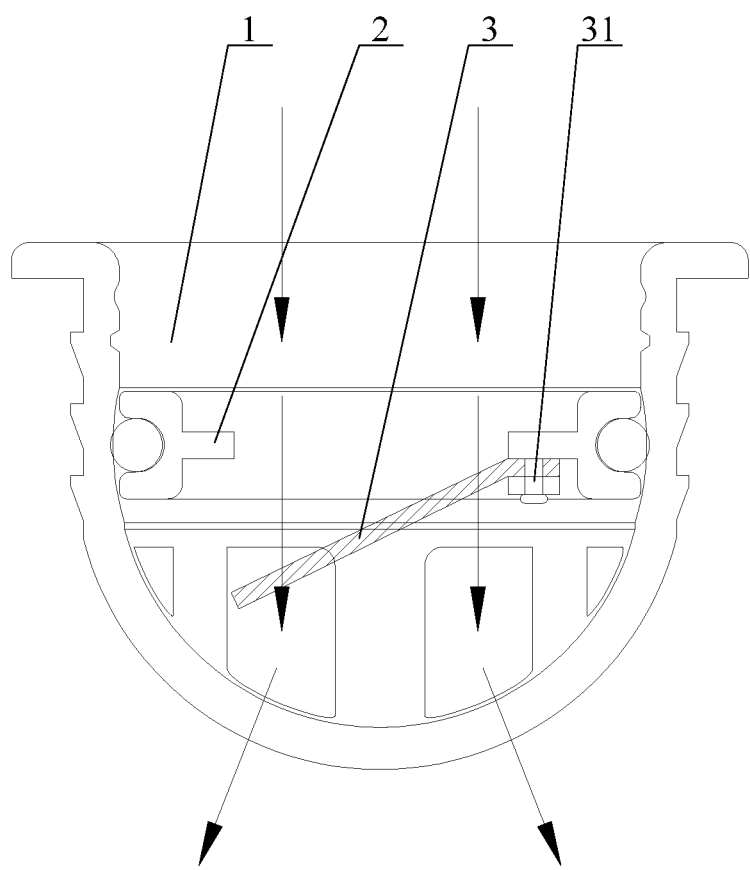
FIG. 17 is a structural schematic diagram of the valve provided in the still another example of the present invention when inflated in one direction.
Figure 18:
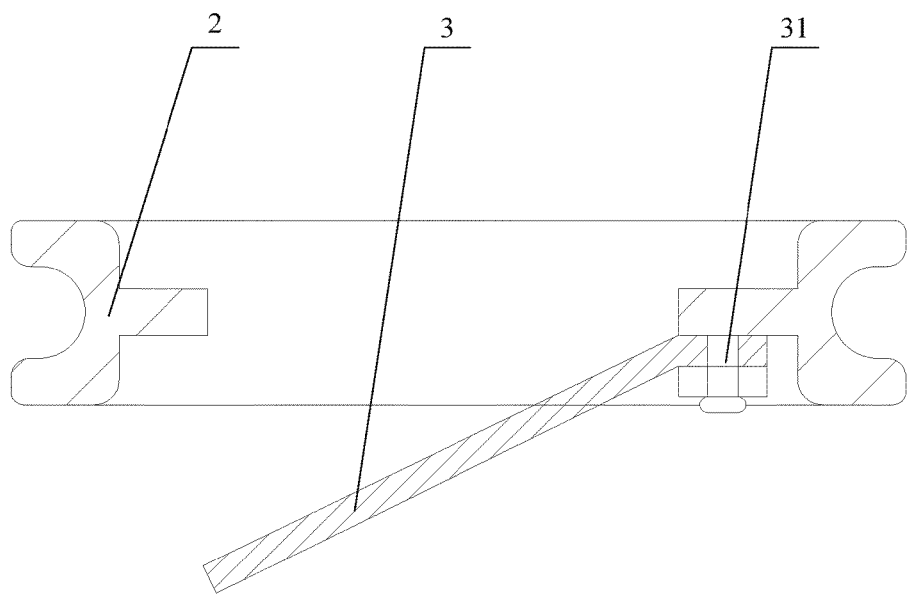
FIG. 18 is a structural schematic diagram of a valve core disk and a one-way diaphragm in an opened state of the valve provided in the still another example of the present invention.
Figure 19:
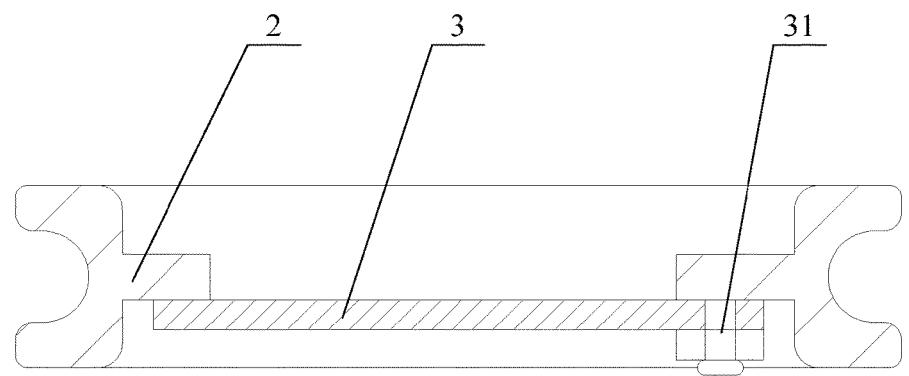
FIG. 19 is a structural schematic diagram of the valve core disk and the one-way diaphragm in a closed state of the valve provided in the still another example of the present invention.
Figure 20:
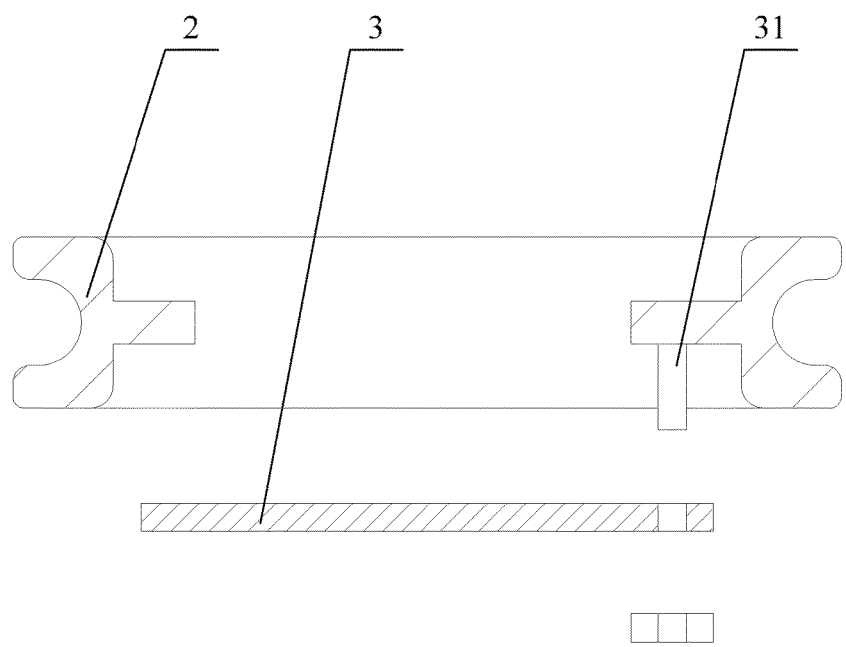
FIG. 20 is an explosive view of the valve core disk and the one-way diaphragm of the valve provided in the still another example of the present invention.

Moreover, the one-way diaphragm connecting rod 31 can be located at any positions of the one-way diaphragm 3, for example, FIG. 16 is a structural schematic diagram of a valve provided in still another example of the present invention; FIG. 17 is a structural schematic diagram of the valve provided in the still another example of the present invention when inflated in one direction; FIG. 18 is a structural schematic diagram of a valve core disk and a one-way diaphragm in an opened state of the valve provided in the still another example of the present invention; FIG. 19 is a structural schematic diagram of the valve core disk and the one-way diaphragm in a closed state of the valve provided in the still another example of the present invention; FIG. 20 is an explosive view of the valve core disk and the one-way diaphragm of the valve provided in the still another example of the present invention.

As shown in FIG. 16 to FIG. 20, the one-way diaphragm connecting rod 31 can be located on the one-way diaphragm 3, near the edge.

Of course, it also may be as in the following example. As shown in FIG. 1 to FIG. 14, the one-way diaphragm connecting rod 31 is provided in a center of the one-way diaphragm 3.

The one-way diaphragm 3 can be made from various materials, and preferably, the one-way diaphragm 3 is made from an elastic material. In this way, a shape of the one-way diaphragm 3 can be recovered in the absence of an external force, sealing the through holes 21 on the valve core disk 2.

Additionally, the one-way sealing in the present example refers to that the fluid only can flow from one side of the through hole 21 to the other side, not vice versa.

In the valve provided in the present example, the valve core disk 2 is rotationally provided within the passage of the valve body 1, and the one-way diaphragm 3 is provided on the valve core disk 2. Taking the case where the fluid is a gas as an example, as shown in FIG. 1, during inflation, the valve core disk 2 is rotated to a position where the gas is only allowed to enter the inflatable object, and the inflatable object is inflated using an inflating tool, and at this time, the gas will push the one-way diaphragm 3 towards the inside of the inflatable object, so as to open the passage. After the inflation is completed, the one-way diaphragm 3 abuts against the valve body 1 due to that a gas pressure inside the inflatable object is greater than a pressure of outside atmosphere, and seals the through holes 21.

As shown in FIG. 2, when the valve core disk 2 is rotated, the passage can be opened to be in a straight-through state, and a user can change the size of a port of the passage by rotating the valve core disk 2, so as to adjust an inflating speed and a deflating speed. As shown in FIG. 3, the user, when needing to accommodate the inflatable object, can rotate the valve core disk 2 to a position where the gas is only allowed to flow out from the inflatable object, and since the gas pressure inside the inflatable object is smaller than the pressure of the outside atmosphere during the extruding process, the one-way diaphragm is enabled to abut against the valve body, forming a state where the gas can only go out but cannot go in, and then the gas of the inflatable object is extruded out, reducing the volume of the inflatable object as much as possible.

As shown in FIG. 1 to FIG. 3, on the basis of the above-mentioned examples, further, both the valve core disk 2 and the section of the passage are in a circular shape; on an outer circumferential surface of the valve core disk 2, an annular slot is provided along an extending direction of the outer circumferential surface; a seal ring 4 is provided in the annular slot; the seal ring 4 is in interference fit with a side wall of the passage, so as to fill in a gap between the valve core disk 2 and the side wall of the passage, and to enable the valve core disk 2 to universally rotate with respect to the valve body 1.

In the above, the section of the seal ring 4 can be of various shapes, for example, a circular shape, a T shape or a square shape and so on.

The seal ring 4 also can be made from various materials, for example, elastic materials such as rubbers or silica gels and so on.

When the user inflates or deflates the inflatable object, since the seal ring 4 and the side wall of the passage are in interference fit, the valve core disk 2 is enabled to rotate in multiple directions, so as to facilitate utilization by the user. In addition, the user, when inflating, using or accommodating the inflatable object, also can utilize the valve core disk 2 to seal the valve core disk 2 and the valve body 1. Thus, during inflation or utilization, the gas inside the inflatable object is prevented from flowing out; and during accommodation, the gas can be prevented from flowing back into the inflatable object to make the volume of the inflatable object become larger.

As shown in FIG. 1 to FIG. 3, on the basis of the above-mentioned examples, further, a blocking part 5 is provided at an opening at one end of the valve body 1. The blocking part 5 is a hollow housing with one end opened, and the blocking part 5 is in a hollowed-out shape.

In the above, the blocking part 5 can be of various shapes, for example, a hemispherical shape, a cylindrical shape, a cubic shape or a cuboid shape and so on. Preferably, the blocking part 5 is in a hemispherical shape, and the diameter of the blocking part 5 is larger than the diameter of the passage. In this way, the friction of the valve core disk 2 with the blocking part 5 during rotation can be avoided.

The blocking part 5 and the valve body 1 can be designed to be separated, and also can be designed to be integrated.

In the present example, when the user rotates the valve core disk 2, in order to prevent the valve core disk 5 from falling into the inflatable object due to excessive force of the user, the valve body 1 is provided with the blocking part 5 inside the inflatable object, which can prevent the valve core disk 2 from falling from the valve body 1 into the inflatable object.

Figure 4:
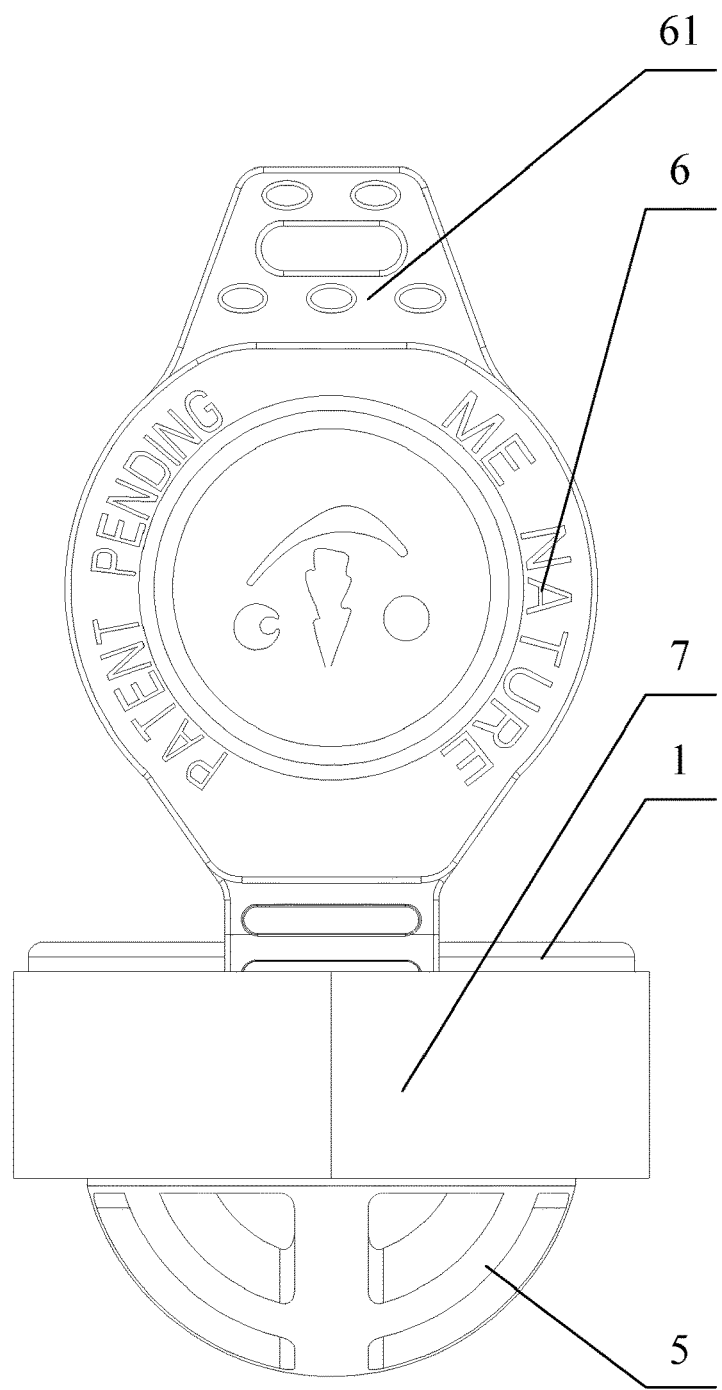
FIG. 4 is a front view of a valve provided in an example of the present invention.
Figure 10:
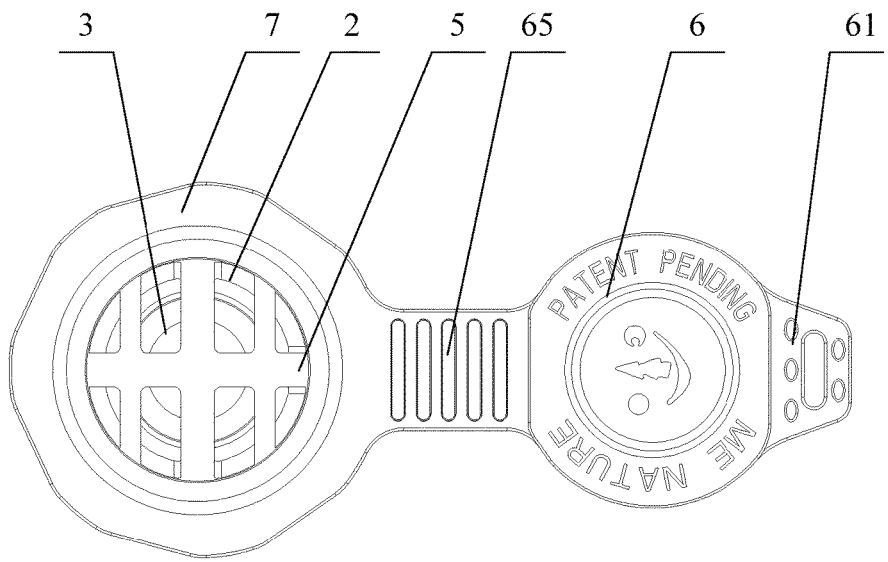
FIG. 10 is a front view of a valve provided in another example of the present invention.

FIG. 4 is a front view of a valve provided in an example of the present invention; and FIG. 10 is a front view of a valve provided in another example of the present invention. As shown in FIG. 4 and FIG. 10, on the basis of the above-mentioned examples, in order to further improve the sealability of the valve, further, the valve comprises an upper cover 6, and the upper cover 6 is provided on an end port of the valve body 1, for sealing the passage. The upper cover 6 is provided at one end of the valve body 1 away from the blocking part.

In the above, the upper cover 6 can have various structures, for example, the upper cover 6 comprises a cover body 62, and the cover body 62 is a hollow housing having one end opened; an annular cover 63 extends outwardly on an edge of the open end of the cover body 62, and the annular cover 63 is perpendicular to a side wall of the cover body 62. This structure can save raw materials of the upper cover 6. Additionally, on an outer side wall of the cover body 62, a plurality of annular bosses are provided along a circumferential direction of the outer side wall, so as to improve the sealability between the upper cover 6 and the valve body 1. In addition, a handle 61 also can be provided on the upper cover 6, facilitating utilization of the upper cover 6 by a user.

The upper cover 6 can be made from various materials, preferably materials having certain flexibility such as plastics, rubbers or silica gels and so on.

Figure 7:
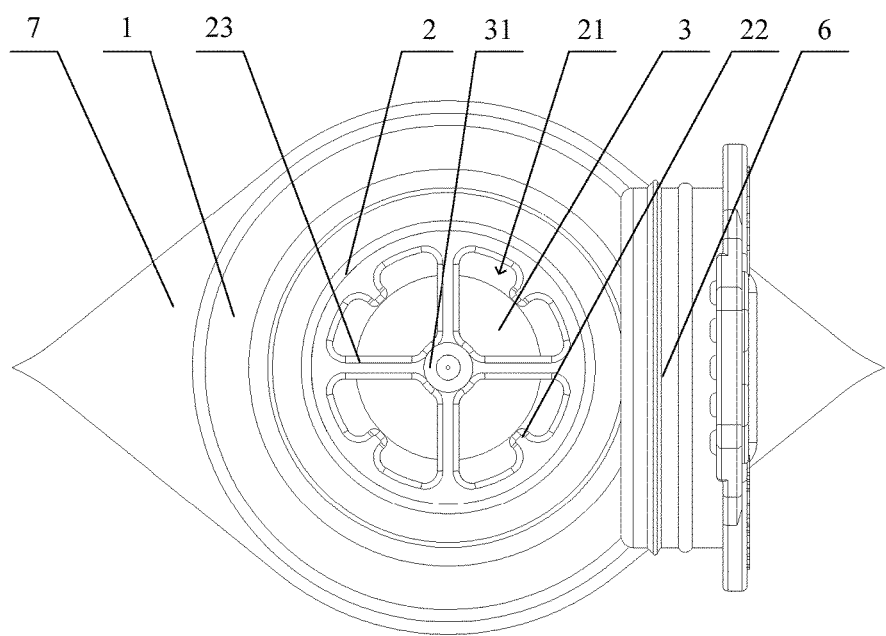
FIG. 7 is a top view of the valve provided in FIG. 4.
Figure 12:
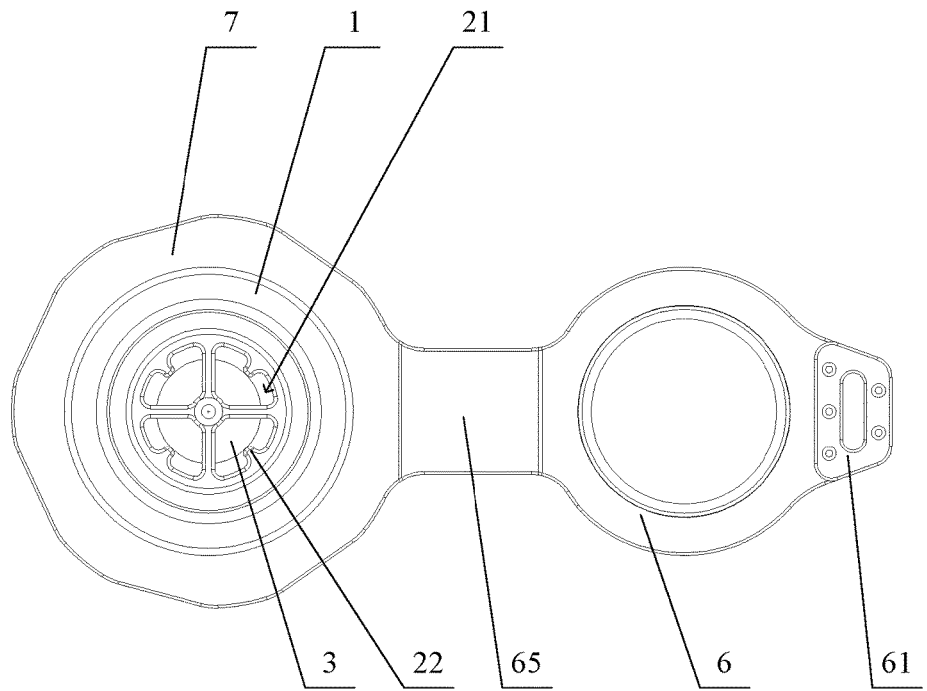
FIG. 12 is a rear view of the valve provided in FIG. 10.

FIG. 7 is a top view of the valve provided in FIG. 4; and FIG. 12 is a rear view of the valve provided in FIG. 10. As shown in FIG. 7 and FIG. 12, on the basis of the above-mentioned examples, further, the valve core disk 2 is provided with a plurality of through holes 21, and the plurality of through holes 21 are distributed, in a circular shape, on the valve core disk 2, forming a circular shape whose circle center is at a circle center of the valve core disk 2; and a central portion of the one-way diaphragm 3 is fixedly connected with a central portion of the valve core disk 2.

In the above, a one-way diaphragm connecting rod 31 is provided at a center of the one-way diaphragm 3, and the one-way diaphragm connecting rod 31 is perpendicular to the one-way diaphragm 3; and the valve core disk 2 is at its center provided with a clamping hole 24 for clamping the one-way diaphragm connecting rod 31.

After the gas enters the passage from one side of the valve core disk 2 away from the one-way diaphragm 3, under the effect of the gas pressure, the one-way diaphragm 3 will move towards a direction away from the valve core disk 2, so as to open the through holes 21 on the valve core disk 2, further smoothing the passage. When introduction of the gas into the passage is stopped, the one-way diaphragm 3 can seal the through holes 21 on the valve core disk 2 utilizing its own elastic deformation and the gas pressure inside the inflatable object.

As shown in FIG. 7 and FIG. 12, on the basis of the above-mentioned examples, further, the through holes 21 are in a fan shape, and a circle center of the fan shape is close to the circle center of the valve core disk 2; a stop block 22 is provided on an arc-shaped edge of each through hole 21, and the stop blocks 22 are configured to block the one-way diaphragm 3.

In the above, the stop blocks 22 can be designed to be integrated with the valve core disk 2 and also can be designed to be separated from the valve core disk 2, moreover, the stop blocks 22 also can be omitted.

As shown in FIG. 4 and FIG. 10, on the basis of the above-mentioned examples, further, the valve also comprises a base 7, and the base 7 is provided with a mounting hole for mounting the valve body 1.

In the above, the mounting hole of the base 7 is a smooth cylindrical through hole.

At least one fixed annular groove 12 also can be provided on a wall of the mounting hole of the base 7 along an opening direction of the mounting hole, a section of the fixed annular groove 12 is in a wedge shape, and a beveled edge of the wedge shape is away from the upper cover 6. A fixed boss, matched with the fixed annular groove 12, is provided on an outer side wall of the valve body 1. The valve body 1 is fixed in the mounting hole utilizing the matching of the fixed annular groove 12 and the fixed boss. When the user opens the upper cover 6, the valve body 1 can be prevented from being brought out from the base 7.

Figure 5:
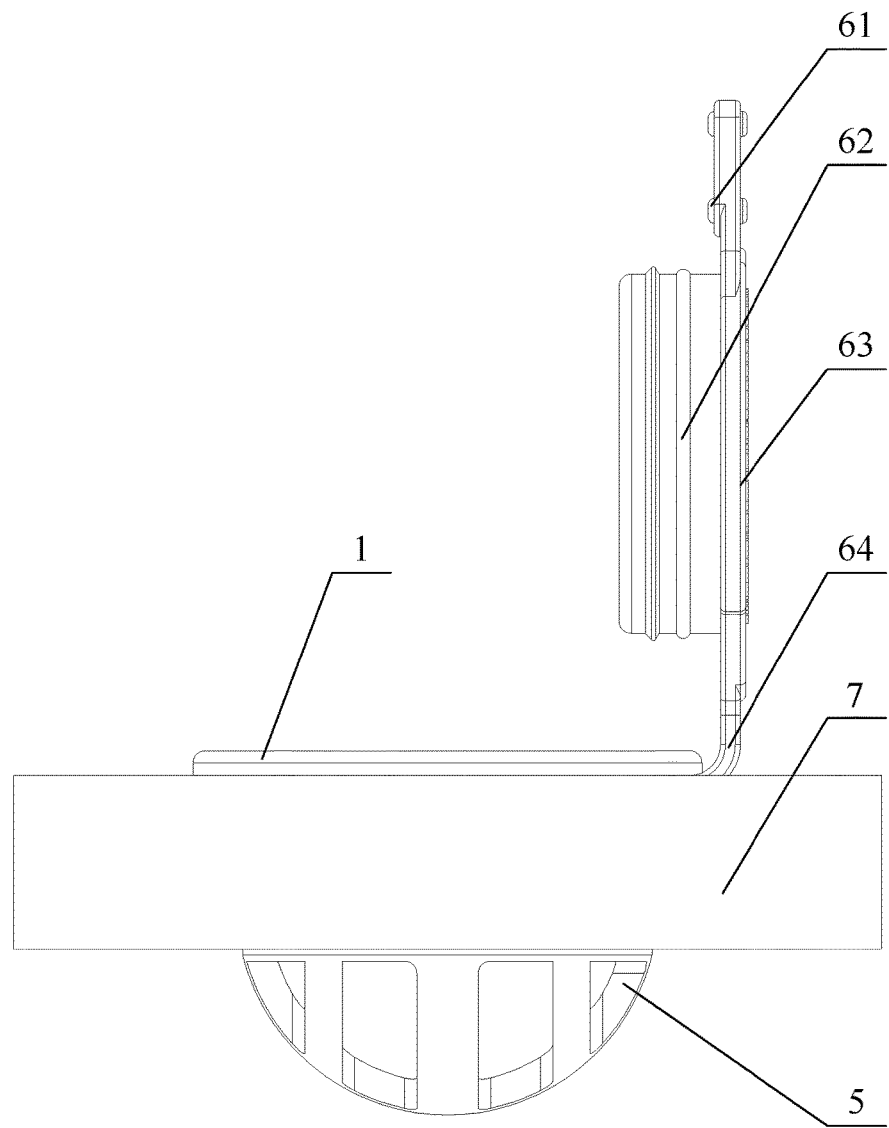
FIG. 5 is a side view of the valve provided in FIG. 4.
Figure 6:
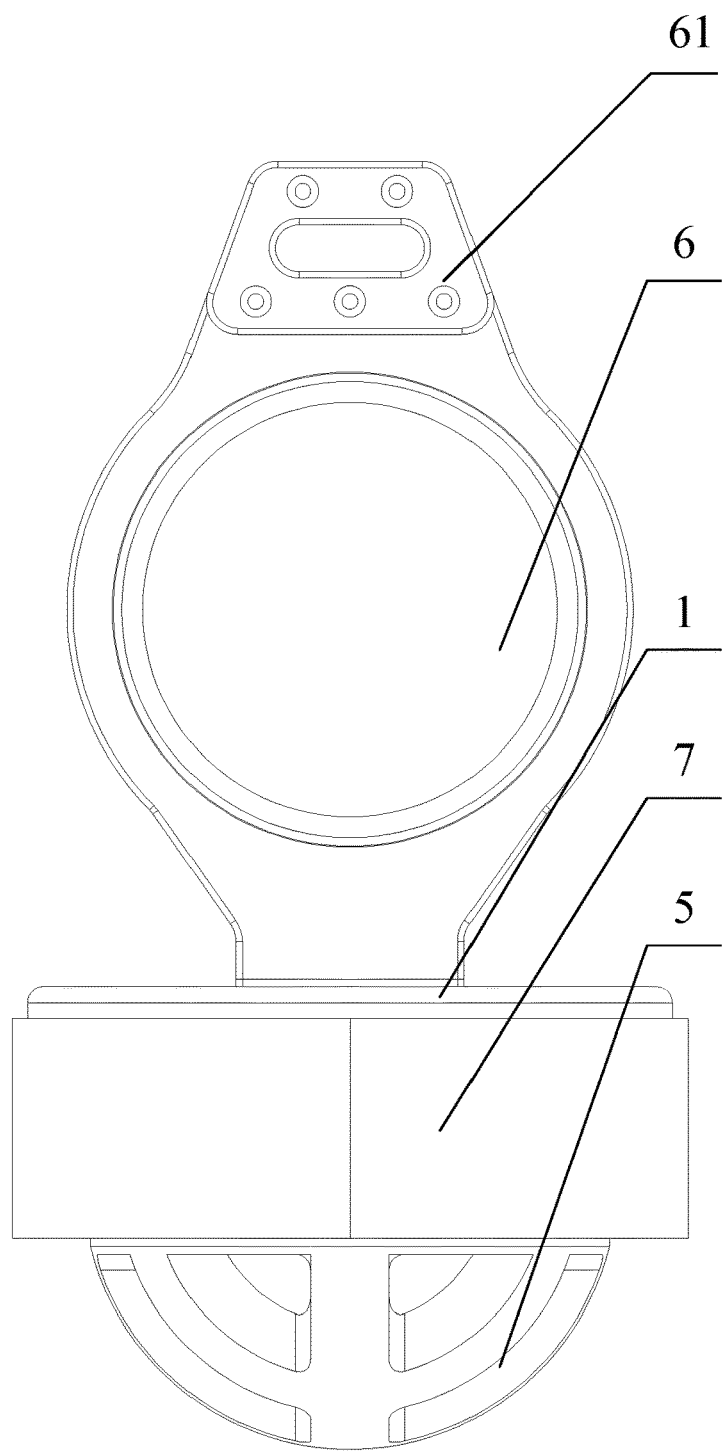
FIG. 6 is a rear view of the valve provided in FIG. 4.
Figure 8:
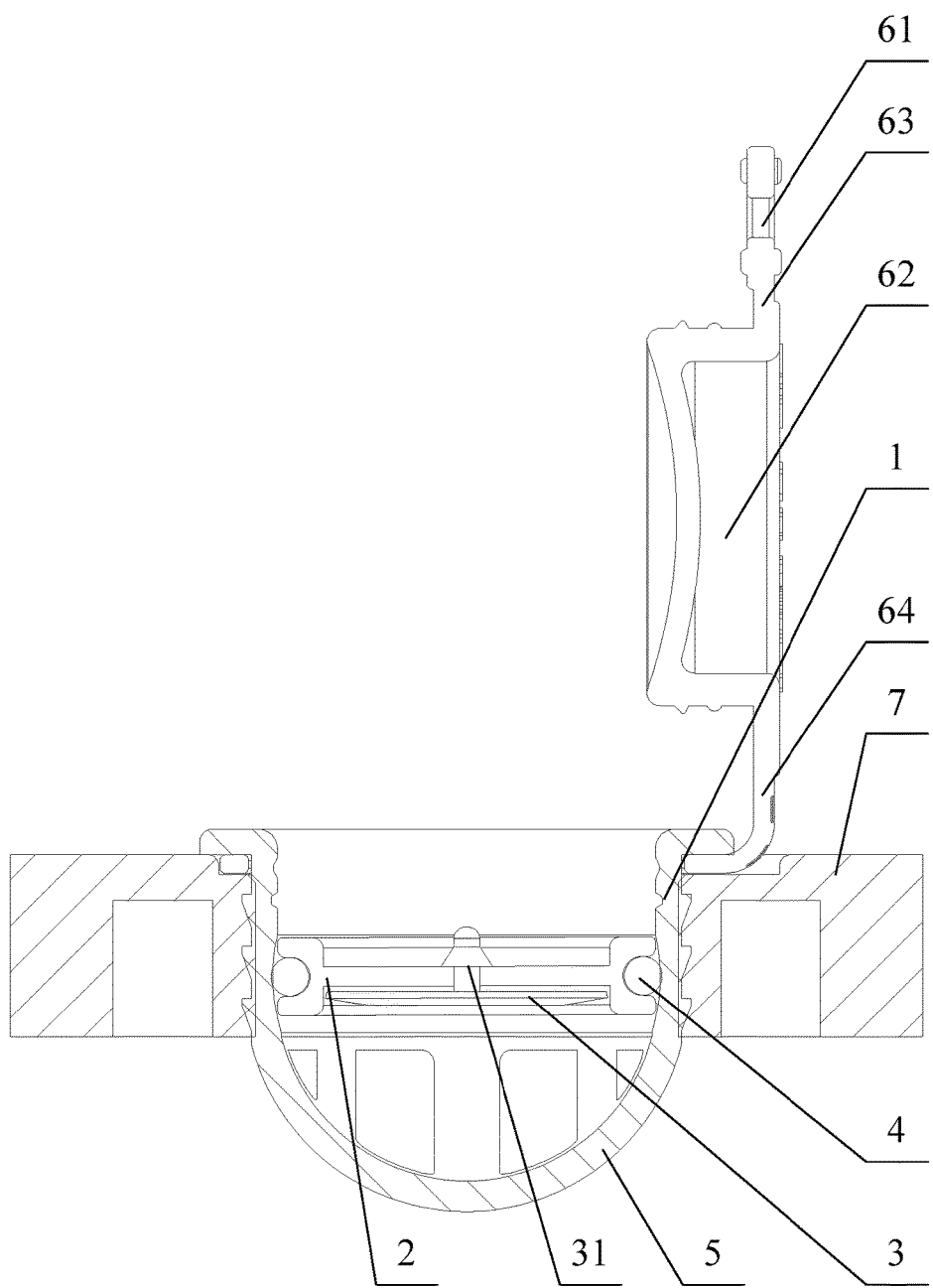
FIG. 8 is a section view of the valve provided in FIG. 4.
Figure 9:
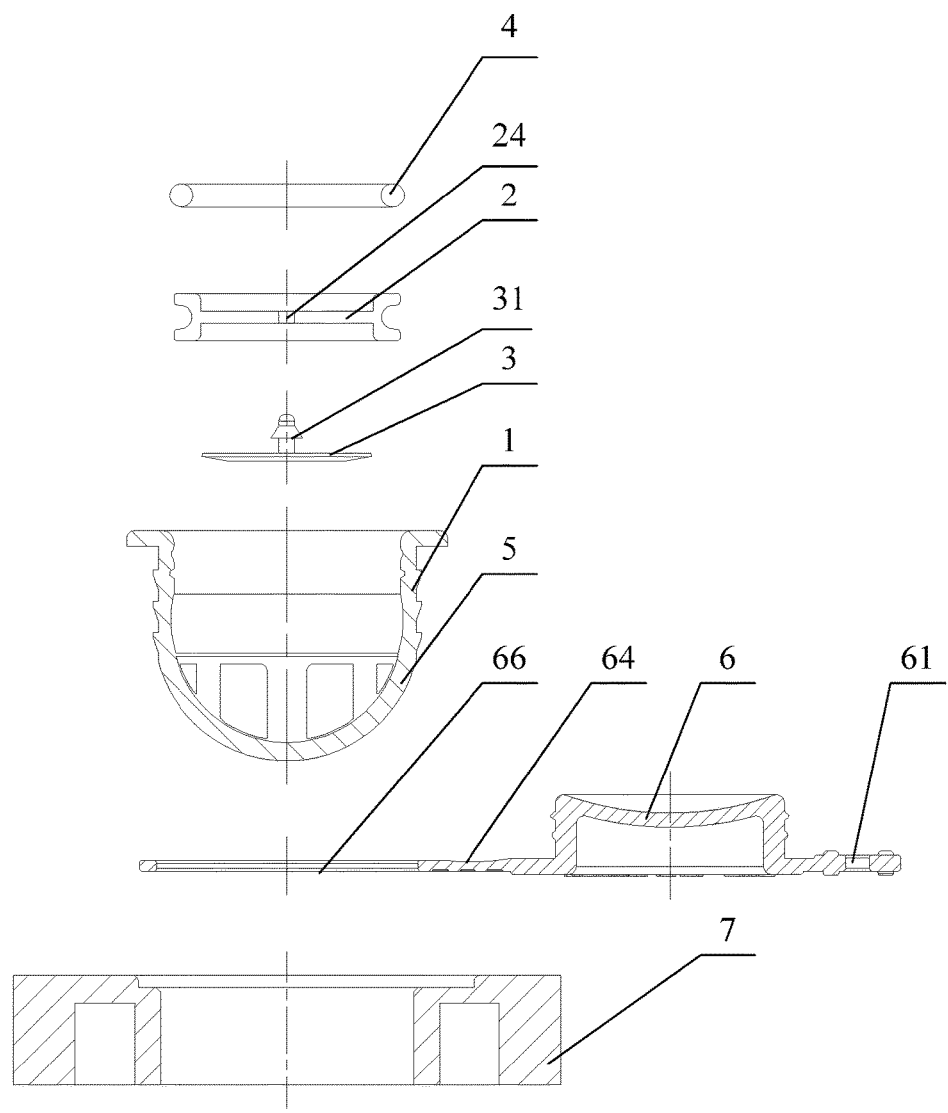
FIG. 9 is an explosive view of the valve provided in FIG. 4.

In addition, the upper cover 6, the base 7 and the valve body 1 can be connected in various ways, and preferably, there are two ways as follows:

FIG. 5 is a side view of the valve provided in FIG. 4; FIG. 6 is a rear view of the valve provided in FIG. 4; FIG. 7 is a top view of the valve provided in FIG. 4; FIG. 8 is a section view of the valve provided in FIG. 4; and FIG. 9 is an explosive view of the valve provided in FIG. 4. As shown in FIG. 4 to FIG. 9, in the first way, the upper cover 6 is provided with a connecting sheet 64, and one end of the connecting sheet is connected with a connecting ring 66; an annular baffle 11 is provided on an edge of one end of the valve body 1 close to the upper cover 6; the base 7 is provided with a connecting annular slot for receiving the connecting ring 66; and the annular baffle 11 is configured to fix the connecting sheet 64 in the connecting annular slot.

Figure 11:
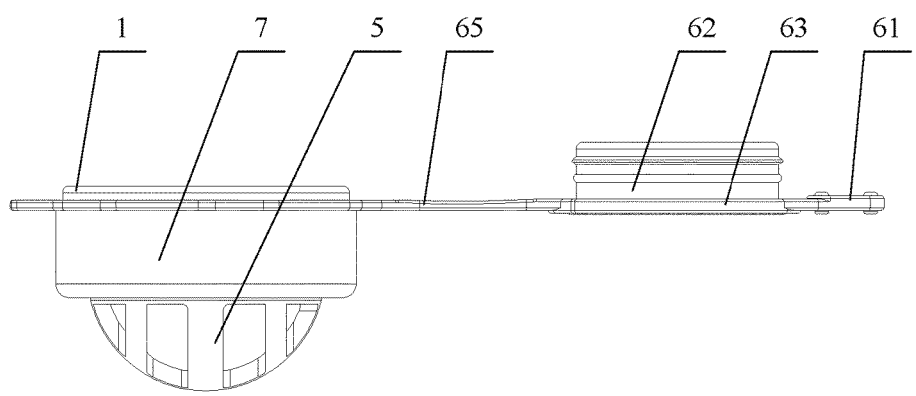
FIG. 11 is a side view of the valve provided in FIG. 10.
Figure 13:
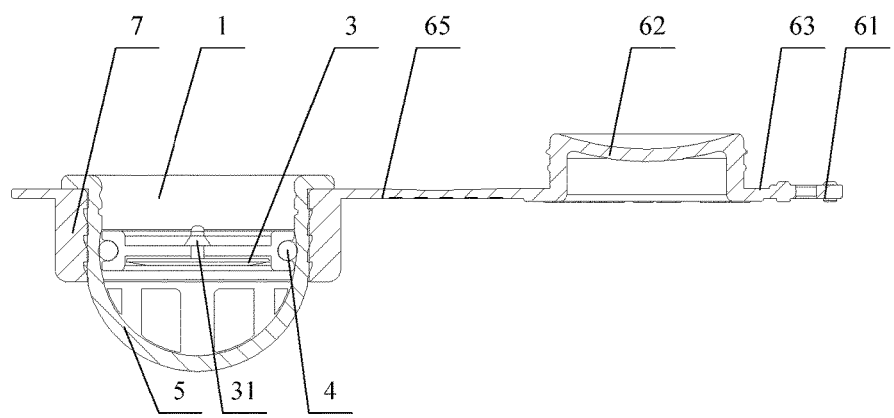
FIG. 13 is a section view of the valve provided in FIG. 10 when an upper cover is open.
Figure 14:
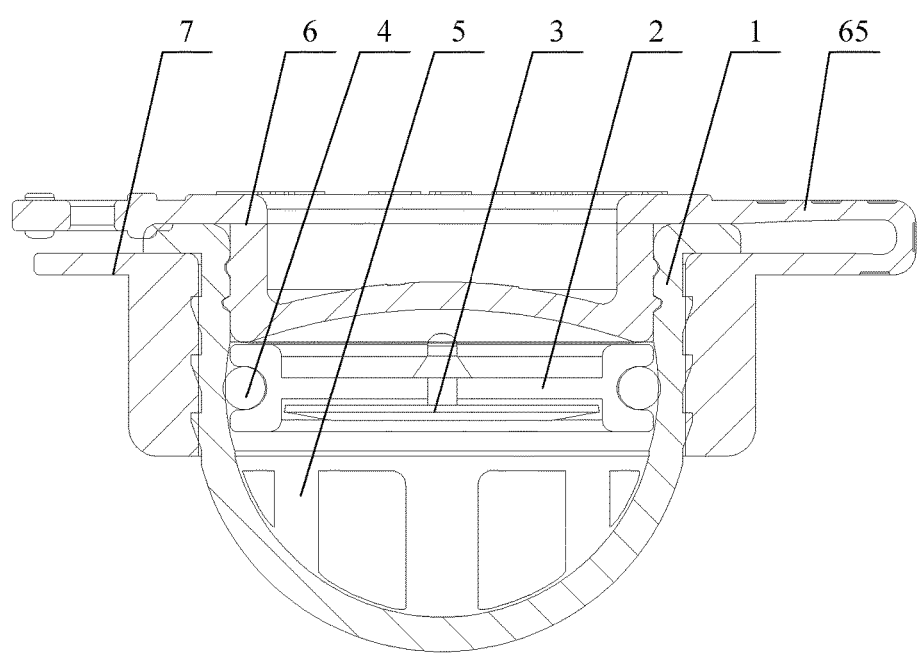
FIG. 14 is a section view of the valve provided in FIG. 10 when the upper cover is closed.
Figure 15:
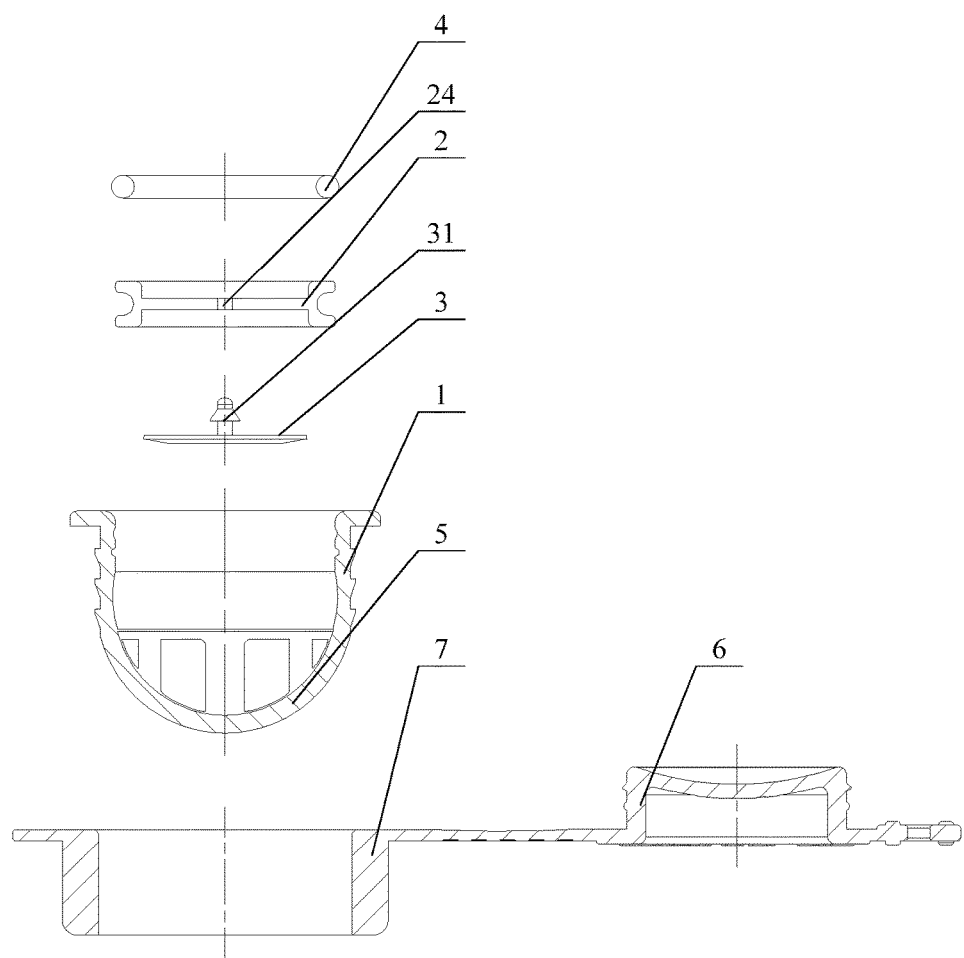
FIG. 15 is an explosive view of the valve provided in FIG. 10.

FIG. 11 is a side view of the valve provided in FIG. 10; FIG. 12 is a rear view of the valve provided in FIG. 10; FIG. 13 is a section view of the valve provided in FIG. 10 when the upper cover is open; FIG. 14 is a section view of the valve provided in FIG. 10 when the upper cover is closed; and FIG. 15 is an explosive view of the valve provided in FIG. 10. As shown in FIG. 9 to FIG. 15, in the second way, the upper cover 6 and the base 7 are connected through a connecting belt 65, and the upper cover 6, the base 7 and the connecting belt 65 are designed to be integrated.

Figure 24:
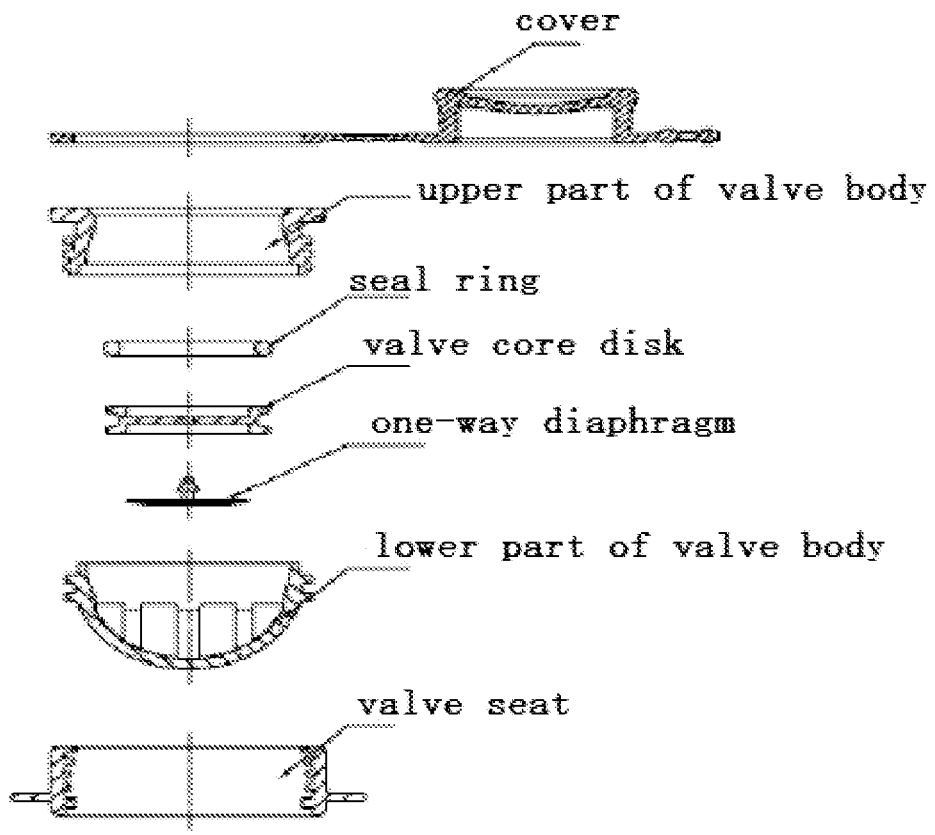
FIG. 24 is an explosive view of the valve body according to the embodiment of the present invention.
Figure 25:
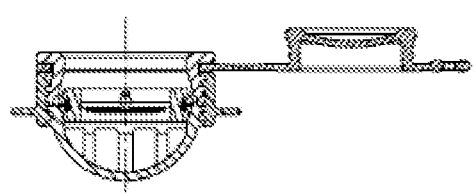
FIG. 25 is a view of the assembled valve body according to the embodiment of the present invention.

Optionally, referring FIGS. 24 and 25, FIG. 24 is an explosive view of the valve body according to the embodiment of the present invention. FIG. 25 is a view of the assembled valve body according to the embodiment of the present invention. As shown in FIGS. 24 and 25, the valve body is divided into two parts, upper and lower parts. The valve body is formed by assembling the upper and lower parts. Particularly, the valve core disk and the seal ring are assembled and then mounted into the upper and lower parts of the valve body, upper valve body and the lower valve body. The diameter of the opening of the upper part is smaller than size of the valve core disk, such that it is not easy to remove the valve core disk in use.

It should be specifically indicated that in the respective examples mentioned above, in order to make it easy for a person skilled in the art to be capable of better understanding the valves disclosed in the present invention, the valves in the present invention are introduced by taking application of the valves in the inflatable object as an example, but it does not mean that the valves in the present invention can only be applied into inflatable objects, and the valves in the present application can also be applied in products in which a liquid acts as a fluid.

Finally, it is to be explained that the above examples are merely to illustrate the technical solutions of the present invention, rather than limiting the invention. While detailed description is made to the present invention with reference to the above-mentioned examples, those ordinarily skilled in the art should understand that the technical solutions recited in the above-mentioned examples still can be modified, or equivalent substitutions can be made to some or all of the technical features thereof; and these modifications or substitutions do not make the essence of the corresponding technical solutions depart from the scope of the technical solutions of the examples of the present invention.

What is claimed is:

1. A valve, comprising a valve body and a valve core disk, wherein the valve body is provided with a passage configured for allowing a fluid to pass through; the valve core disk is provided within the passage and is rotatable with respect to the valve body; the valve core disk is provided with through holes, one side face of the valve core disk is provided with a one-way diaphragm, and the one-way diaphragm is configured for sealing the through holes in one direction, so as to enable the valve core disk to seal the passage in one direction; the valve core disk and a section of the passage both are in a circular shape; on an outer circumferential surface of the valve core disk, an annular slot is provided along an extending direction of the outer circumferential surface; a seal ring is provided in the annular slot; the seal ring is in interference fit with a side wall of the passage, so as to fill in a gap between the valve core disk and the side wall of the passage, and to enable the valve core disk to universally rotate with respect to the valve body.

2. The valve according to claim 1, wherein a blocking part is provided at an opening at one end of the valve body; the blocking part is a hollow housing with one end opened, and the blocking part is in a hollowed-out shape.

3. The valve according to claim 1, further comprising an upper cover, wherein the upper cover is provided on an end port of the valve body for sealing the passage.

4. The valve according to claim 1, wherein the valve core disk is provided with a plurality of the through holes, and the plurality of the through holes are distributed on the valve core disk, forming a circular shape whose circle center is at a circle center of the valve core disk; and a central portion of the one-way diaphragm is fixedly connected with a central portion of the valve core disk.

5. The valve according to claim 4, wherein a one-way diaphragm connecting rod is provided at a center of the one-way diaphragm, and the one-way diaphragm connecting rod is perpendicular to the one-way diaphragm; and the valve core disk has a center provided with a clamping hole for clamping the one-way diaphragm connecting rod.

6. The valve according to claim 4, wherein the through holes are in a fan shape, and a circle center of the fan shape is close to the circle center of the valve core disk; a stop block is provided on an arc-shaped edge of each of the through holes, and the stop blocks are configured to block the one-way diaphragm.

7. The valve according to claim 3, further comprising a base, wherein the base is provided with a mounting hole for mounting the valve body.

8. The valve according to claim 7, wherein the upper cover is provided with a connecting sheet, and an annular baffle is provided on an edge of one end of the valve body close to the upper cover;
the base is provided with a recess for receiving the connecting sheet; and the annular baffle is configured to fix the connecting sheet in the recess.

9. The valve according to claim 7, wherein the upper cover and the base are connected through a connecting belt, and the upper cover, the base and the connecting belt are designed to be integrated.

10. The valve according to claim 1, wherein the valve body is divided into upper and lower parts and the valve body is formed by assembling the upper and lower parts.

11. The valve according to claim 10, wherein the valve core disk and the seal ring are assembled and then mounted into the upper and lower parts of the valve body, and a diameter of an opening of the upper part is smaller than size of the valve core disk, such that it is not easy to remove the valve core disk in use.

* * * * *